United States Patent [19]
Removille et al.

[11] 3,855,472
[45] Dec. 17, 1974

[54] DEVICE AND A PHOTOGRAPHIC FILM PACKAGE FOR USE IN AUTOMATIC RADIOGRAPHY

[75] Inventors: Jacques Robert Philippe Removille, Luxemburg; Francois Schmit, Bascharage, both of Luxembourg

[73] Assignee: European Atomic Energy Community (Euratom), Luxemburg, Luxembourg

[22] Filed: Jan. 16, 1973

[21] Appl. No.: 324,175

[30] Foreign Application Priority Data
Jan. 19, 1972  Luxembourg............................ 64613

[52] U.S. Cl.................... 250/321, 250/327, 250/496
[51] Int. Cl. ........................................... G03b 41/16
[58] Field of Search ........... 250/320, 321, 327, 496, 250/472, 473

[56] References Cited
UNITED STATES PATENTS
3,493,746  2/1970  Webb.................................. 250/439

Primary Examiner—James W. Lawrence
Assistant Examiner—C. E. Church
Attorney, Agent, or Firm—Stevens, Davis, Miller & Mosher

[57] ABSTRACT

A device and a photographic film package for use in automatic radiography inside an enclosure usually having an atmosphere or conditions other than the ambient atmosphere in which the device has a passage lined with shielding material for receiving a photographic film and when in use the film is held in the passage in a sealing-tight manner. The package comprises a flexible envelope containing a photographic film of the automatically developing type. The device may be inserted into the enclosure through an aperture in the wall thereof and secured in position on the outside. Photographic plates may be inserted and extracted from the device by an operator outside the enclosure.

4 Claims, 8 Drawing Figures

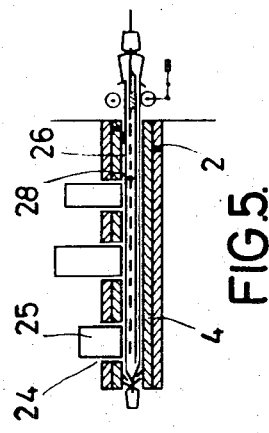
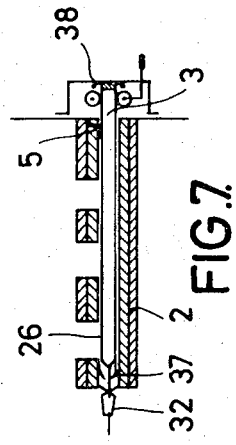
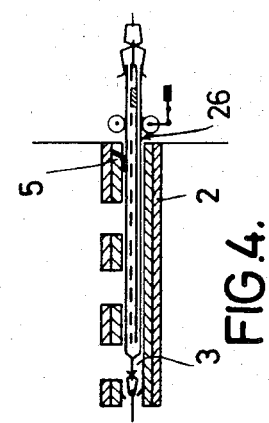
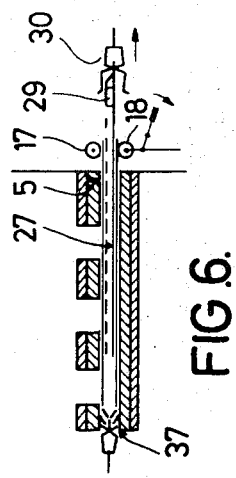
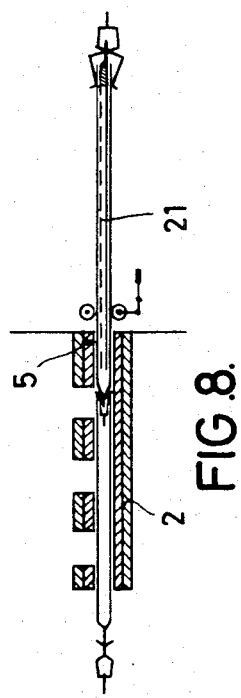

DEVICE AND A PHOTOGRAPHIC FILM PACKAGE FOR USE IN AUTOMATIC RADIOGRAPHY

BACKGROUND OF THE INVENTION

1. Field of the Invention

The invention relates to a device and a photographic film package for use in automatic radiography inside sealing-tight enclosures under given ambient conditions.

2. Description of the Prior Art

In an increasing number of cases, it is necessary to perform operations in protective enclosures, e.g., to take automatic X-ray photographs of samples which are either biologically dangerous or sensitive to oxidation and germs, or to make observations at temperatures and pressures other than normal.

One particular case is the automatic radiography of samples emitting beta and gamma radiation. To this end, the following conditions should be respected: very close contact between the sample and the film; no leakage of atmosphere between the enclosure and the exterior; non-contamination of the film; no exposure of the film to light rays and/or radiation; rapid development of the film after exposure; and protection of the operator against the dangers of radioactivity.

The device and the photographic film package according to the invention satisfy all the above conditions in a reliable, simple manner.

SUMMARY OF THE INVENTION

The present invention provides in one of its aspects a device for automatically radiographing radioactive or X-ray emitting samples inside an enclosure said device comprising: a holder having a passage therein, said passage being lined with a shielding material and having an inlet and an outlet, a seal disposed in said passage at said inlet, retaining means disposed in said passage at said outlet, said holder having one or more recesses adjacent said passage between said inlet and outlet adapted to receive said samples to be radiographed, and means for securing said holder in a sealing-tight manner to the inner wall of said enclosure whereby when said device is in use said passage receives a photographic plate through said inlet and holds said plate between said inlet and outlet.

In a preferred embodiment of the invention, means for squeezing the developing fluid onto the film is mounted upstream of the seal in the mouth of the passage.

In a further aspect the present invention provides a photographic film package comprising a closed, flexible envelope, a photographic film of the automatically developing type disposed in said envelope, a container of developing fluid disposed at one end inside said envelope, handle means at one edge of said envelope, ejection means at the edge of said envelope remote from the edge having said handle means and in which the length of said envelope is greater than the sensitive length of said film by such an amount that said film is automatically developed in said envelope while it is being extracted from a holding device, said developing fluid container being positioned such that the developing fluid is squeezed from said container during its extraction from said holding device.

The samples to be radiographed are in very close contact with the photographic film, since the recesses in the sample-holding device open directly into the passage in the holder. Accordingly, the samples are placed on the film envelope, which is secured in the passage, in which case the seal between the passage inlet and the envelope forms a lock preventing contamination by the ambient air.

Since the passage is lined with a shielding material and the film is in an envelope, the film is well protected against contamination and against exposure to light.

The film is developed rapidly after exposure by a prior-art instantaneous self-developing system (Polaroid - registered trade mark). The operations required for taking X-ray photographs are simple and not liable to error, since the film can be introduced merely by inserting it in the device when assembled. During the exposure, the film is held in position by two static components in the inlet and outlet of the passage. The extraction of the film after exposure does not affect the position of the envelope and consequently does not prevent it acting as a lock, since it is secured in position by the retaining means. Finally, the empty envelope is removed merely by ejecting it into the enclosure when the holder is charged with a new film.

The invention will be more clearly understood from the accompanying drawings which, by way of a non-limitative example, show the holder and the photographic film package in detail and in operation.

BRIEF DESCRIPTION OF THE DRAWINGS

FIGS. 4 to 8 show the sequence of operations (loading, exposure, extraction and unloading) to be performed when the film package is used to take X-ray photographs.

In FIGS. 1 to 8, like elements are given like reference numbers.

DESCRIPTION OF THE PREFERRED EMBODIMENTS

Figure 1:
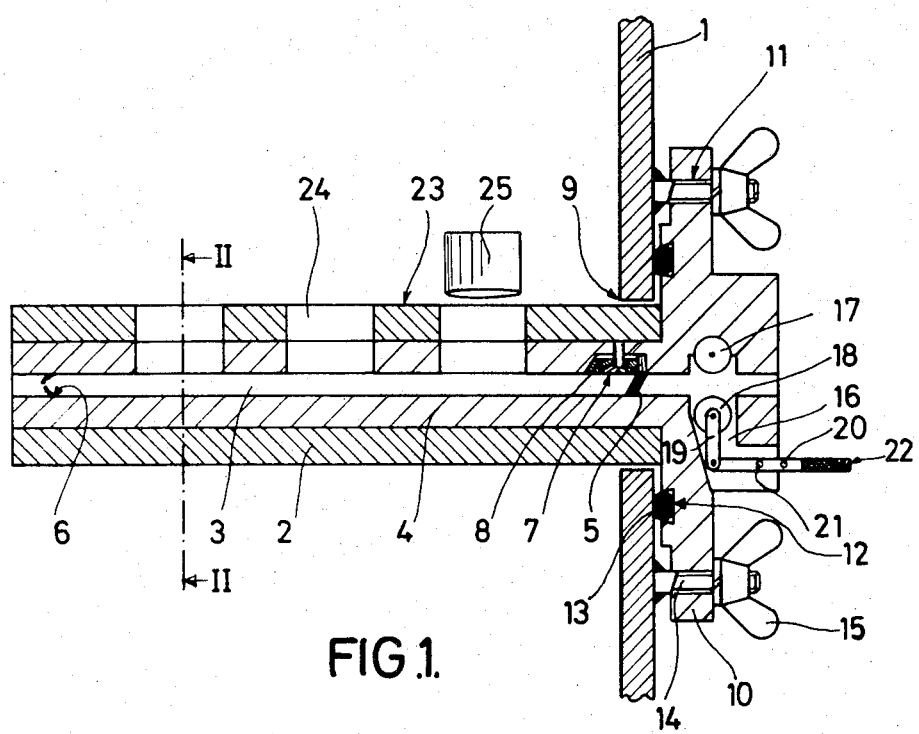
FIG. 1 is a longitudinal section across an automatic radiography device.
Figure 2:
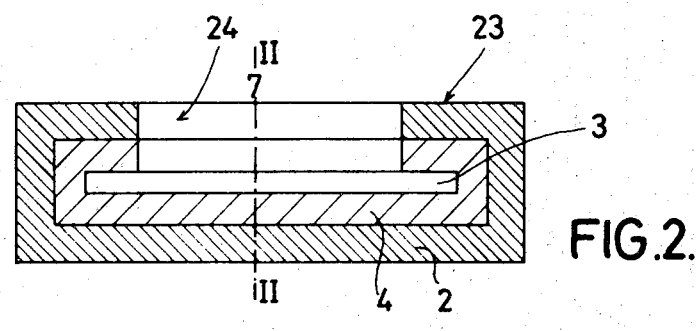
FIG. 2 is a cross section along the line II—II in FIG. 1.

Referring to FIGS. 1 and 2, the chamber containing a dangerous atmosphere is represented by its wall 1. Consequently, the dangerous atmosphere is to the left of the wall and the ambient atmosphere is to the right thereof. The device according to the invention comprises the following components: a holder 2 having an open passage 3 lined with a shielding material 4 (lead); a resilient lip seal 5 (rubber) and a retaining means 6 having grips, catches or the like. Seal 5 is secured in the holder by a screw 7 and a plate 8. The film casing when in the exposure position is between members 5 and 6.

The holder 2 extends through an aperture 9 formed in the wall 1 of the enclosure, and is secured in sealing-tight manner to the outer surface thereof. To this end, the shielding material comprises a flange 10 perforated at 11 and a circular groove 12 containing a sealing ring 13. The flange is secured to the enclosure by studs 14 soldered to the wall, and by nuts 15. A recess 16 in flange 10 contains the mechanism for squeezing the container of developing fluid into the film. The mechanism comprises a stationary roller 17 and a movable roller 18, the latter being mounted on a lever system 19, 20. Lever 20 is articulated around a shaft 21 and has a key 22. The top 23 of the holder is formed with open recesses 24 adapted to receive samples for radiographing.

Figure 3:
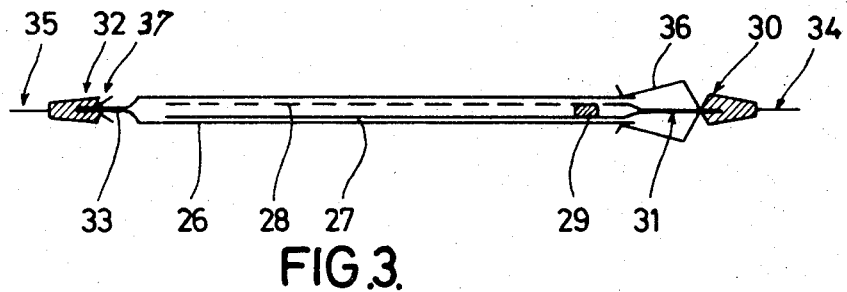
FIG. 3 is a longitudinal section through the envelope and the photographic plate.

With reference to FIG. 3, the casing for a photographic plate according to the invention comprises the following elements: a rectangular flexible envelope 26 (made e.g. of caron), the automatically and instantaneously-developing photographic plate comprising a positive paper 27 and a sensitive paper 28, the container of developing fluid 29, the head 30 having a metal pull handle secured to the film edge 31 and clipped on to envelope 26, and the ejection head 32 secured to the envelope edge 33. Heads 30 and 32 have tongues 34, 35 respectively and catches 36, 37 respectively. Envelope 26 is longer than the positive and sensitive film papers; this is a safety precaution which may be necessary to ensure that after exposure, the film is developed inside the envelope while being extracted.

We shall now describe the operation of the novel device and of the casing for a photographic plate, with references to FIGS. 4 to 8, where the device has been shown in diagrammatic manner for greater clarity.

In FIG. 4 the photographic plate, which is completely sealing-tight owing to envelope 26, is introduced into passage 3 in holder 2. The lip seal 5 maintains sealing-tightness during insertion.

In FIG. 5, the sensitive paper 28 is printed through envelope 26, merely by placing samples 25 of the envelope in one of the recesses 24. The beta or gamma radiation prints the film, and the part of the film around the printing surface is protected by the material 4 shielding the holder 2.

In FIG. 6, the film is extracted by pulling the handle 30, after the rollers 17, 18 have squeezed the developer 29. Next, the positive paper 27 is impregnated with developing fluid, which is left to react while the film is being extracted. Subsequently, the photograph is obtained by separating the positive from the sensitive paper, in the same manner as when using an ordinary Polaroid film.

In FIG. 7, envelope 26 remains secured to holder 2, since head 32 is locked by catches 37; sealing-tightness is maintained by seal 5. Passage 3 is closed by a static cover 38 when the device is not in use.

In order to take the next X-ray photograph (FIG. 8), a new photographic plate casing is inserted, thus ejecting the empty envelope into the enclosure and taking its place in holder 2. During the replacement operation, the seal 5 keeps the two atmospheres apart in sealing-tight manner.

The device which has been described is advantageous in view of its simplicity of operation, the speed with which photographs are obtained on Polaroid film, and the advantage that only clean articles have to be manipulated.

We claim:

1. A device for automatically radiographing radioactive or X-ray emitting samples inside a radiation shielding enclosure, said device comprising:
   means for supporting a photographic plate including a plate holder having a passage therein, said passage being lined with a radiation shielding material and having a plate inlet and a plate outlet,
   a seal disposed in said passage at said inlet,
   plate retaining means disposed in said passage at said outlet,
   said holder having one or more recess means adjacent said passage between said inlet and outlet for holding said samples to be radiographed,
   and means for securing said holder in a sealing-tight manner to the inner wall of said enclosure,
   whereby when said device is in use said passage receives a photographic plate through said inlet and holds said plate between said inlet and outlet.

2. A device according to claim 1 characterised in that means for squeezing developing fluid onto the photographic film is mounted upstream of said seal in the mouth of said passage.

3. A device according to claim 1, characterised in that said seal has lips for closing one end of said passage when the photographic plate is in position therein.

4. A device according to claim 1, characterised in that said retaining means has resilient grips or catches which project into said passage and are inclined towards the outlet thereof.

* * * * *